(12) United States Patent
Suzuki

(10) Patent No.: US 11,951,523 B2
(45) Date of Patent: Apr. 9, 2024

(54) ROTATING-LAYERING MOLD AND PRESS APPARATUS COMPRISING ROTATING-LAYERING MOLD

(71) Applicant: SANKYO SEISAKUSHO CO., Tokyo (JP)

(72) Inventor: Kengo Suzuki, Kikugawa (JP)

(73) Assignee: SANKYO SEISAKUSHO CO., Tokyo (JP)

( * ) Notice: Subject to any disclaimer, the term of this patent is extended or adjusted under 35 U.S.C. 154(b) by 926 days.

(21) Appl. No.: 16/964,354

(22) PCT Filed: Jan. 24, 2019

(86) PCT No.: PCT/JP2019/002240
§ 371 (c)(1),
(2) Date: Jul. 23, 2020

(87) PCT Pub. No.: WO2019/146686
PCT Pub. Date: Aug. 1, 2019

(65) Prior Publication Data
US 2021/0031256 A1     Feb. 4, 2021

(30) Foreign Application Priority Data
Jan. 26, 2018   (JP) .................................. 2018-011697

(51) Int. Cl.
*B23P 19/00*    (2006.01)
*B21D 28/02*    (2006.01)
(Continued)

(52) U.S. Cl.
CPC ............. *B21D 28/02* (2013.01); *B21D 37/10* (2013.01); *B21D 43/22* (2013.01)

(58) Field of Classification Search
CPC ...... B21D 43/22; B21D 28/02; B21D 28/145; B21D 37/10; H02K 15/02
See application file for complete search history.

(56) References Cited

U.S. PATENT DOCUMENTS

2009/0297076 A1* 12/2009 Murakami .............. F16C 35/02
384/100

FOREIGN PATENT DOCUMENTS

CN     206756067 U    12/2017
JP     S566534 U      1/1981
(Continued)

OTHER PUBLICATIONS

Office Action dated Jun. 21, 2022 in corresponding Japanese Application No. 2019-567142.
(Continued)

*Primary Examiner* — Paul D Kim
(74) *Attorney, Agent, or Firm* — Harness, Dickey & Pierce, P.L.C.

(57) ABSTRACT

The present invention provides a rotating-layering mold whereby a punched sheet is rotated according to a prescribed angle and layered by an upper mold and a lower mold working in tandem, and provides a press apparatus comprising the rotating-layering mold. A rotating-layering mold comprises a squeeze ring in which is provided a holding hole for holding a punched sheet, the squeeze ring being capable of rotating with respect to a lower mold so that an upper outer circumferential surface of the squeeze ring lies along an inner circumferential surface of the lower mold. The rotating-layering mold further comprises a first thrust bearing, a second thrust bearing, and a radial bearing in order to support the rotation of the squeeze ring with respect to the lower mold.

8 Claims, 4 Drawing Sheets

(51) Int. Cl.
*B21D 37/10* (2006.01)
*B21D 43/22* (2006.01)
*H05K 13/04* (2006.01)

(56) References Cited

FOREIGN PATENT DOCUMENTS

| JP | 201120132 A | 2/2011 |
| JP | 2011125884 A | 6/2011 |
| JP | 2011156585 A | 8/2011 |
| JP | 2013010120 A | 1/2013 |
| JP | 201343195 A | 3/2013 |

OTHER PUBLICATIONS

Office Action dated Jul. 11, 2022 in corresponding Korean Application No. 10-2020-7021474.
International Search Report (in English and Japanese) and Written Opinion of the International Searching Authority (in Japanese) issued in PCT/JP2019/002240, dated, Apr. 10, 2019; ISA/JP.
Office Action dated Oct. 21, 2021 in corresponding Taiwan Application No. 108102909.
Search Report dated Oct. 21, 2021 in corresponding Taiwan Application No. 108102909.
Supplementary European Search Report dated Sep. 3, 2021 in corresponding EP Application No. 19743741.
Office Action dated Jul. 23, 2021 in corresponding Chinese Application No. 2019800059896.

\* cited by examiner

ROTATING-LAYERING MOLD AND PRESS APPARATUS COMPRISING ROTATING-LAYERING MOLD

CROSS REFERENCE TO RELATED APPLICATIONS

This application is a U.S. National Phase Application under 35 U.S.C. 371 of International Application No. PCT/JP2019/002240 filed on Jan. 24, 2019, which claims the benefit of priority from Japanese Patent Application No. 2018-011697 filed on Jan. 26, 2018. The entire disclosures of all of the above applications are incorporated herein by reference.

TECHNICAL FIELD

The present invention relates to a rotating-layering mold of rotating, according to a predetermined angle, plate materials punched by a cooperation of an upper mold and a lower mold so as to laminate the plate materials, and a press apparatus including the rotating-layering mold.

BACKGROUND ART

A plate-shaped rolled steel plate is supplied between an upper mold and a lower mold of a press apparatus from a flatted and rolled state, and is punched into a predetermined shape by a cooperation of the upper mold slidable up and down and the lower mold. Then, a rotating-layering mold is used for laminating the punched plate-shaped rolled steel sheets to form a rotor, a stator, or the like, called a motor core. By the way, the rolled steel plate has the slightly different thickness in the width direction since the pressure at the supporting portions of the rolling rollers at both ends in the width direction and the pressure at the central portion of the rolling roller at the center in the width direction are different during rolling. Therefore, when the rolled steel plate supplied to the press apparatus is punched by the upper mold and the lower mold, and the punched plate-shaped rolled steel sheets are laminated as they are, thick portions of the punched plate-shaped rolled steel sheets are laminated to one another and thin portions of the punched plate-shaped rolled steel sheets are laminated to one another. Thus, while such a laminated member has a thick portion formed by laminating the thick portions to one another, the member has a thin portion formed by laminating the thin portions to one another, and the shape of the member is thus inclined. If such an inclined member is used as the rotor and the stator, the performance of the motor may be deteriorated. Therefore, in order not to incline the laminated member, the plate-shaped rolled steel sheets punched by the rotating-layering mold are rotated according to a predetermined angle so as to laminate them.

In recent years, motors are often used in mechanical devices, automobiles, or the like, and the demand for the motors is increasing. As a result, the demand for motor cores such as rotors and stators that configure the motors is also increasing, and it is required to improve the manufacturing efficiency for the motor cores. In order to improve the manufacturing efficiency, a rotating-layering mold capable of rotating the punched plate-shaped rolled steel sheets at high speed so as to laminate them is required. Also, when the plate-shaped rolled steel plate supplied to the press apparatus is punched into a predetermined shape by the cooperation of the upper mold and the lower mold, a thrust load is generated in the vertical direction in the rotating-layering mold. In particular, when punching at high speed in order to improve the manufacturing efficiency, the thrust load becomes more noticeable and is transmitted to the rotating-layering mold, reducing the rotation accuracy of the rotating-layering mold and decreasing the manufacturing accuracy for the motor cores. Further, in order to rotate the rotating-layering mold, for example, when a rotation of a drive unit is transmitted to the rotating-layering mold by a timing belt, a radial load due to a tension (tensile force) of the timing belt coupling the rotating-layering mold and the drive unit is generated. In particular, when rotating at high speed in order to improve the manufacturing efficiency, it is necessary to increase the tension of the timing belt, and the radial load due to the tension inclines the posture of the rotating-layering mold, reducing the rotation accuracy of the rotating-layering mold and decreasing the manufacturing accuracy for the motor cores. Therefore, the rotating-layering mold which is not affected by the thrust load in the vertical direction and the radial load in the horizontal direction is required.

Patent Literature 1 discloses a laminated core manufacturing apparatus of manufacturing laminated cores by punching steel sheet pieces from an electromagnetic steel plate so as to laminate them, including an upper mold including an contour punch, a lower mold including a squeeze ring fixed to an contour punch die corresponding to the contour punch and extending downward, and an index device of driving the squeeze ring to rotate intermittently. The squeeze ring is rotatably supported by the lower mold via a plurality of bearings, and the steel sheet pieces that are sequentially punched and are dropped from an upper end opening into the interior are held in a laminated state.

Patent Literature 2 discloses a rotating-layering unit having a mold holder equipped with a mold mounting portion where a lower mold is attached, the mold mounting portion of rotating, at a predetermined angle, plate materials punched by a cooperation of an upper mold and the lower mold so as to laminate them, and a part accommodating portion of accommodating the punched plate-shaped parts, and a holder support member having an inner peripheral surface surrounding an outer peripheral surface of the mold holder, the holder support member of rotatably supporting the mold holder. A cross roller bearing is configured to interpose a plurality of rolling elements which roll in contact with a first V-shaped groove formed on the outer peripheral surface of the mold holder and a second V-shaped groove formed on the inner peripheral surface of the holder support member between the mold holder and the holder support member.

CITATION LIST

Patent Literature

PATENT LITERATURE 1: JP-A-2011-20132
PATENT LITERATURE 2: JP-A-2013-43195

SUMMARY OF INVENTION

Technical Problem

The squeeze ring disclosed in Patent Literature 1 is rotatably supported by the lower mold via two upper and lower bearings. However, these two upper and lower bearings cannot support the squeeze ring so as not to be affected by all of the thrust load in the vertical direction and the radial load in the horizontal direction, whereby there is a problem that the rotation accuracy of the squeeze ring is reduced and the manufacturing accuracy for the motor cores is decreased.

In the rotating-layering unit disclosed in Patent Literature 2, in order not to cause permanent deformation of the cross roller bearing due to the downward load that acts on the mold holder when the plate materials are punched, a space between a top of the mold holder and the holder support member must be smaller than a relative movement amount, which causes permanent deformation of the cross roller bearing when the plate materials are punched, between the mold holder and the holder support member, whereby there is a problem that it is prevented from improving the manufacturing efficiency of the rotating-layering unit.

Therefore, an object of the present invention is to solve the above problems, to make it less susceptible to be affected by the thrust load in the vertical direction and the radial load in the horizontal direction, and to provide the rotating-layering mold of rotating, according to a predetermined angle, the plate materials punched by the cooperation of the upper mold and the lower mold so as to laminate the plate materials and the press apparatus including the rotating-layering mold.

Solution to Problem

According to an aspect of the present invention, a rotating-layering mold of rotating, according to a predetermined angle, plate materials punched by a cooperation of an upper mold and a lower mold so as to laminate the plate materials includes a squeeze ring provided with a holding hole of holding the punched plate materials. The squeeze ring is configured to rotate with respect to the lower mold such that an outer peripheral surface of the squeeze ring lies along an inner peripheral surface of the lower mold. The rotating-layering mold further includes a first thrust bearing, a second thrust bearing, and a radial bearing in order to support the rotation of the squeeze ring with respect to the lower mold.

According to a specific example of the present invention, in the rotating-layering mold, the radial bearing is arranged between the first thrust bearing and the second thrust bearing.

According to a specific example of the present invention, the rotating-layering mold includes a first inner ring portion and a second inner ring portion, and the first thrust bearing, the second thrust bearing, and the radial bearing are arranged between the first inner ring portion and the second inner ring portion.

According to a specific example of the present invention, in the rotating-layering mold, the first inner ring portion and the second inner ring portion are fastened such that the first thrust bearing and the second thrust bearing are in a pre-loaded state.

According to a specific example of the present invention, in the rotating-layering mold, the rotation of the squeeze ring is guided by a guide configured with a second outer ring portion fixed to the lower mold and the lower mold.

According to a specific example of the present invention, in the rotating-layering mold, in a state where a gap is generated between the guide and the squeeze ring, the first thrust bearing and the second thrust bearing are in the preloaded state.

According to a specific example of the present invention, in the rotating-layering mold, the first thrust bearing is configured with a first outer ring portion fixed to the lower mold, the first inner ring portion, and rolling elements, the second thrust bearing is configured with the first outer ring portion, the second inner ring portion, and rolling elements, and the radial bearing is configured with the first outer ring portion, the first inner ring portion or the second inner ring portion, and rolling elements.

According to a specific example of the present invention, in the rotating-layering mold, the rolling elements of the first thrust bearing, the rolling elements of the second thrust bearing, and the rolling elements of the radial bearing are arranged radially inward with respect to the outer peripheral surface of the squeeze ring.

According to a specific example of the present invention, the rotating-layering mold further includes a driven pulley fixed to the squeeze ring.

According to another aspect of the present invention, the press apparatus including the above rotating-layering mold includes a drive unit including a motor having a output shaft to rotate, a drive pulley fixed to the output shaft, and a transmission member of transmitting the rotation of the drive pulley based on the rotation of the output shaft to the driven pulley and rotating the squeeze ring according to the predetermined angle.

Advantageous Effect of Invention

According to the present invention, since the squeeze ring can be supported so as not to be affected by a thrust load with respect to the vertical direction of up and down and a radial load with respect to the horizontal direction, the rotation accuracy of the squeeze ring can be improved and the manufacturing accuracy for the motor cores can be improved.

Other objects, features and advantages of the present invention will become apparent from the following description of the embodiments of the present invention taken in conjunction with the accompanying drawings.

DESCRIPTION OF EMBODIMENTS

Embodiments according to the present invention will be described with reference to the drawings. However, the present invention is not limited to those embodiments.

An embodiment of a rotating-layering mold and a press apparatus of the present invention will be described with reference to FIGS. 1 to 4.

Figure 1:
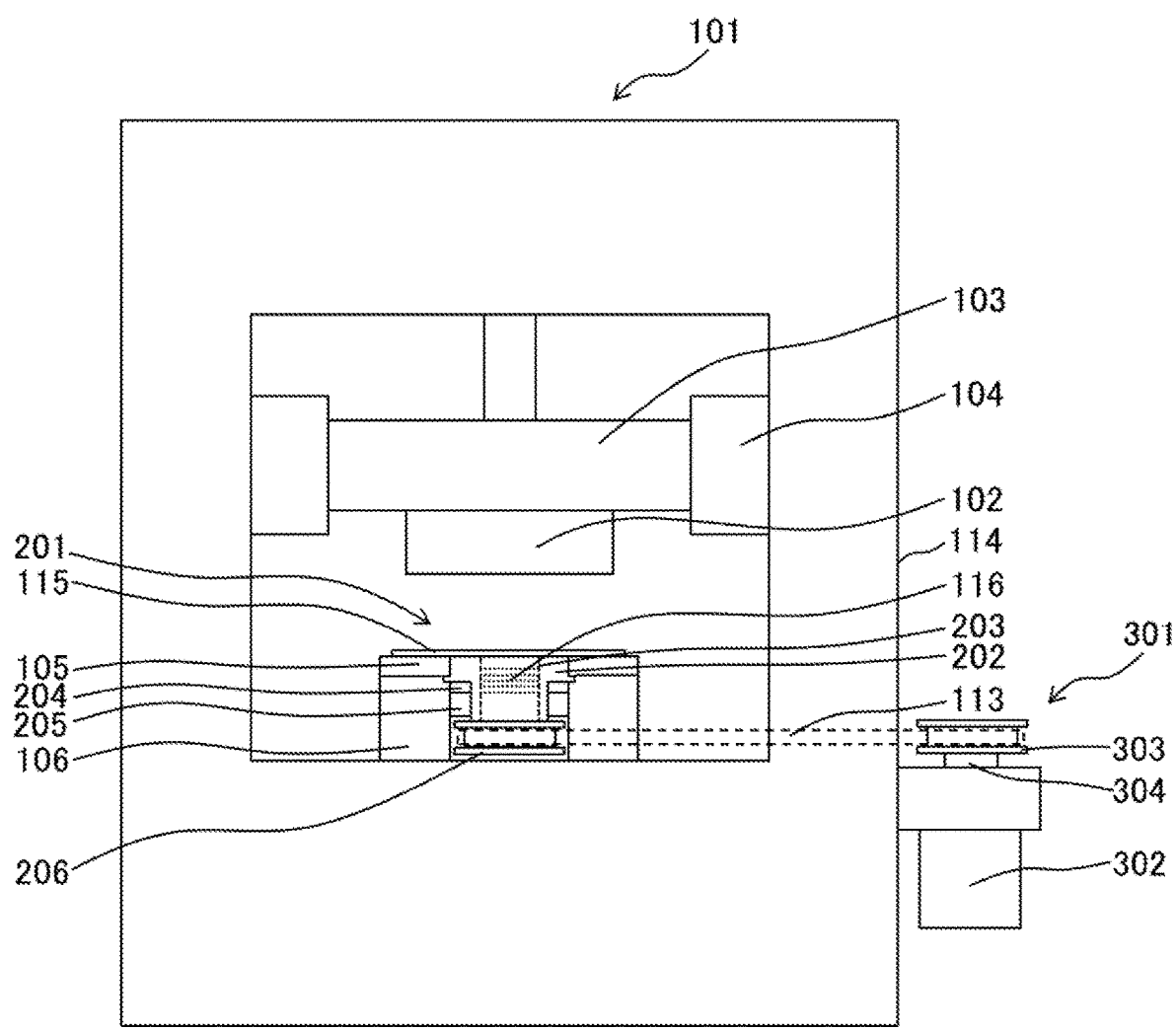
FIG. 1 is a schematic view of a press apparatus including a rotating-layering mold and a drive unit as an embodiment of the present invention as seen from the front.

FIG. 1 shows a schematic view of a press apparatus 101 including a rotating-layering mold 201 and a drive unit 301 as an embodiment of the present invention as seen from the front. The press apparatus 101 includes a slide member 103 that is slidable in the vertical direction with respect to a main body frame of the press apparatus 101, an upper mold guide member 104 that is installed on the main body frame and slidably guides the slide member 103, an upper mold 102 installed on a lower surface of the slide member 103, and a lower mold 105 fixed to a housing 106 installed on the main body frame. In the press apparatus 101, a rolled steel plate 115 as a plate material is supplied between the upper mold 102 and the lower mold 105, and the slide member 103 slides downward via the upper mold guide member 104. The supplied rolled steel sheets 115 are punched by a contour punch of the upper mold 102 and a contour punching die of the lower mold 105 corresponding to this contour punch of the upper mold 102.

When the rolled steel sheets 115 are punched and the slide member 103 slides in the upward direction, the contour punch of the upper mold 102 is drawn from the contour punching die of the lower mold 105, and the punched rolled steel sheets 115 are then dropped into a holding hole 203 provided in the squeeze ring 202 fixed to the contour punching die and are held by a frictional force. Subsequently, the squeeze ring 202 rotates such that the punched rolled steel sheets 115 held in the holding hole 203 are also rotated according to a predetermined angle. By repeating punching and rotating in this manner to sequentially laminate the punched rolled steel sheets 115, a laminated body 116 having no inclined shape for use in a motor core such as a rotor and a stator that configure a motor, or the like can be formed. In addition, the angle to rotate the rolled steel sheets 115 is not limited. However, for example, the rolled steel sheets 115 may be rotated according to the predetermined value such as 45°, 60°, 72°, 90°, 120°, or the like that can be divided by dividing 360° by an integer so as to sequentially laminate them. Alternatively, the rolled steel sheets 115 may be rotated according to the predetermined value such as 45°+1°, 60°+2°, or the like that is obtained by adding a minute angle to an angle that can be divided by dividing 360° by an integer so as to sequentially laminate them in a spiral shape having a skew.

Figure 3:
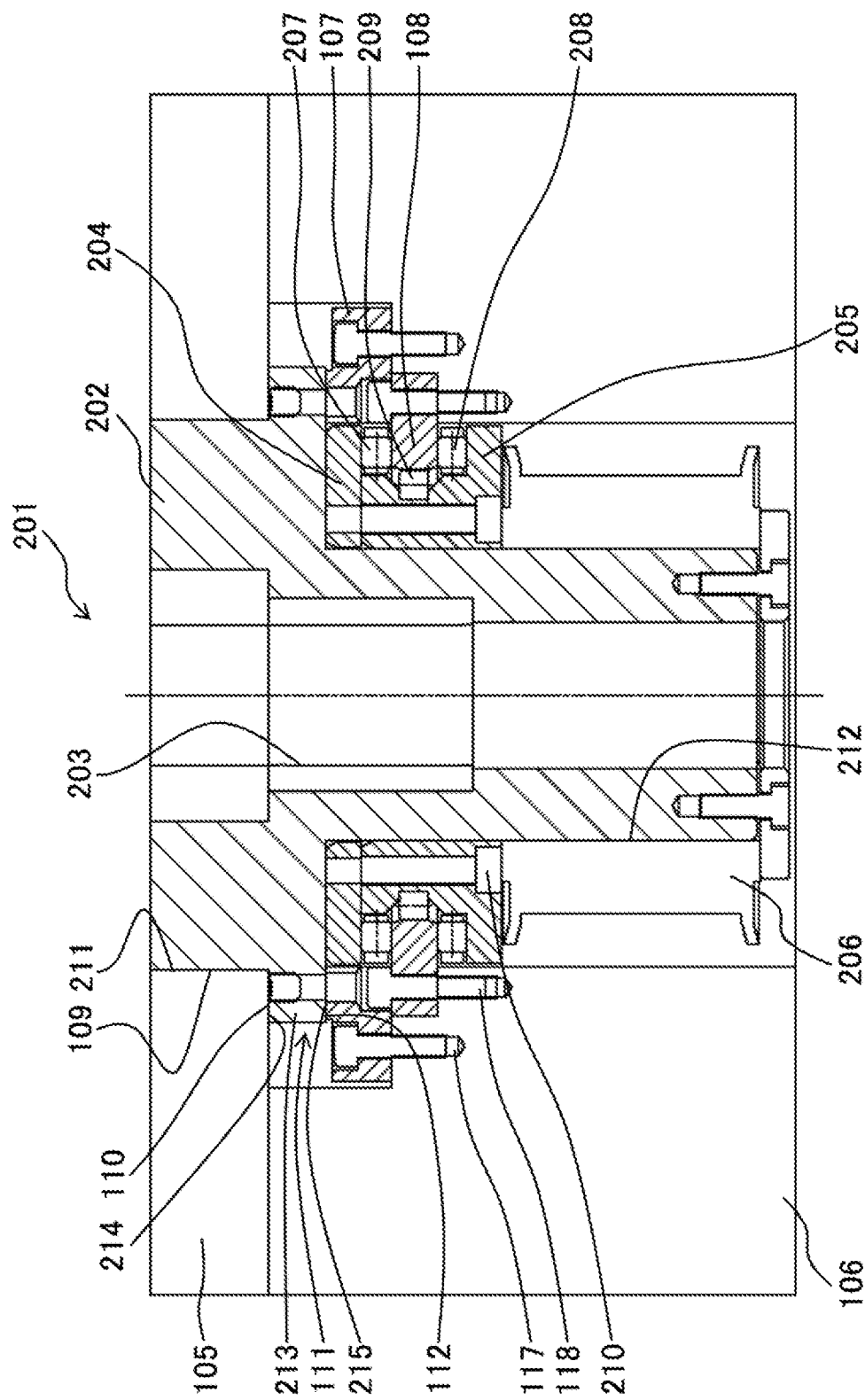
FIG. 3 is a cross-sectional view of the rotating-layering mold shown in FIG. 1.

FIG. 3 shows a cross-sectional view of the rotating-layering mold 201 of rotating the rolled steel sheets 115 punched by the cooperation of the upper mold 102 and the lower mold 105 according to the predetermined angle so as to laminate them. The rotating-layering mold 201 includes the squeeze ring 202 that can be accommodated within a cylindrical hole provided in the lower mold 105. The squeeze ring 202 can rotate with respect to the lower mold 105 such that an upper outer peripheral surface 211 of the squeeze ring 202 lies along an inner peripheral surface 109 of the hole of the lower mold 105. The rotating-layering 201 further includes a first thrust bearing (an upper thrust bearing), a second thrust bearing (a lower thrust bearing), and a radial bearing in order to support the rotation of the squeeze ring 202 with respect to the lower mold 105. The squeeze ring 202 can be supported by the upper thrust bearing and the lower thrust bearing so as not to be affected by a thrust load with respect to the vertical direction of up and down and can be further supported by the radial bearing so as not to be affected by a radial load with respect to the horizontal direction. A position of the radial bearing with respect to the upper thrust bearing and the lower thrust bearing is not particularly limited. However, when the radial bearing is arranged between the upper thrust bearing and the lower thrust bearing, it is possible to compactly configure the rotating-layering mold 201 and reduce the cost.

The rotating-layering mold 201 includes a first inner ring portion (an upper inner ring portion) 204 and a second inner ring portion (a lower inner ring portion) 205 fixed to the squeeze ring 202. The upper thrust bearing, the lower thrust bearing, and the radial bearing may be arranged between the upper inner ring portion 204 and the lower inner ring portion 205. In addition, although the upper inner ring portion 204 and the lower inner ring portion 205 are separate components from the squeeze ring 202 in FIG. 3, the upper inner ring portion 204 or the lower inner ring portion 205 may be configured to be integrated with the squeeze ring 202.

The upper inner ring portion 204 and the lower inner ring portion 205 are fastened such that the upper thrust bearing and the lower thrust bearing are in a preloaded state. If there is an internal clearance in the bearing, the rigidity of the bearing becomes low such that the rotation vibration of the squeeze ring 202 becomes large, and the axis of the squeeze ring 202 tends to tilt. Therefore, a load is applied in the thrust direction in advance so as to eliminate the internal clearance such that preload is applied to the upper thrust bearing and the lower thrust bearing. By applying the preload, it is possible to reduce the vibration and improve the acoustic performance. When the press apparatus 101 is operating, that is, when the squeeze ring 202 rotates with respect to the lower mold 105, the slide member 103 slides in the downward direction such that the rolled steel sheets 115 are punched by the contour punch of the upper mold 102 and the contour punching die of the lower mold 105, the slide member 103 slides in the upward direction such that the contour punch of the upper mold 102 is pulled out from the contour punching die of the lower mold 105, and the squeeze ring 202 then rotates with respect to the lower mold 105 again, it is desirable that the upper inner ring portion 204 and the lower inner ring portion 205 be fastened such that the upper thrust bearing and the lower thrust bearing are in the preloaded state. Since the upper thrust bearing and the lower thrust bearing are in the preloaded state, the squeeze ring 202 can be reliably supported by the upper thrust bearing and the lower thrust bearing so as to rotate without being affected by the thrust load with respect to the vertical direction of up and down, and the rotation accuracy of the squeeze ring 202 can be thus improved. In addition, although the upper inner ring portion 204 and the lower inner ring portion 205 may be fastened by an inner ring portion screw 210, a fastening means is not limited. The magnitude of the preload can be adjusted by the fastening means.

Figure 4:
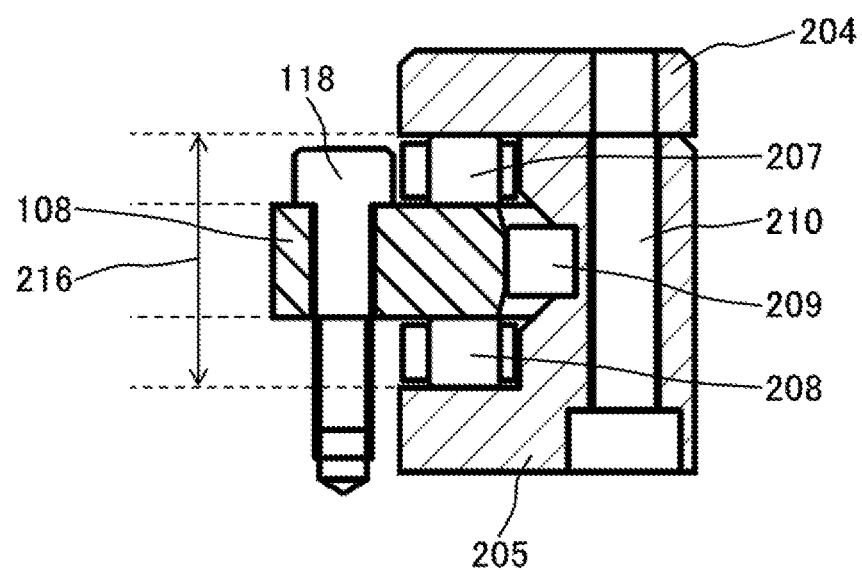
FIG. 4 is a partially enlarged cross-sectional view of the rotating-layering mold shown in FIG. 1.

As shown in FIGS. 3 and 4, the upper thrust bearing may be configured with a first outer ring portion (a lower outer ring portion) 108 fixed to the lower mold 105 via the housing 106 by a lower outer ring portion screw 118, the upper inner ring portion 204, and rolling elements 207, each rotating about the axis in the horizontal direction, the lower thrust bearing may be configured with the lower outer ring portion 108, the lower inner ring portion 205, and rolling elements 208, each rotating about the axis in the horizontal direction, and the radial bearing may be configured with the lower outer ring portion 108, the lower inner ring portion 205, and rolling elements 209, each rotating about the axis in the vertical direction. By managing dimension such that the length of a space 216 between the upper inner ring portion 204 and the lower inner ring portion 205 for configuring the upper thrust bearing, the lower thrust bearing, and the radial bearing is smaller than the total length of the outer diameter of the rolling element 207, the thickness of the lower outer ring portion 108, and the outer diameter of the rolling element 208, when the upper inner ring portion 204 and the lower inner ring portion 205 are fastened, the internal clearance disappears such that the upper thrust bearing and the lower thrust bearing can be in the preloaded state. Then, although the rotating-layering mold 201 moves relatively with respect to the lower mold 105 when the press apparatus 101 is operating, by managing dimension such that a difference between the total length of the outer diameter of the rolling element 207, the thickness of the lower outer ring portion 108, and the outer diameter of the rolling element 208 and the length of the space 216 is larger than a relative movement amount of the rotating-layering mold 201, the upper thrust bearing and the lower thrust bearing can be in the preloaded state more reliably. In addition, although the lower outer ring portion 108 is fixed to the housing 106 as a component separate from the housing 106 in FIG. 3, it may be configured to be integrated with the housing 106. Moreover, a second outer ring portion (an upper outer ring portion) 107 is fixed to the lower mold 105 via the housing 106 by an upper outer ring portion screw 117. However, the upper outer ring portion 107 may be also configured to be integrated with the housing 106.

The rotation of the squeeze ring 202 may be guided by a guide 111 configured with the lower mold 105, the housing 106, and the upper outer ring portion 107 fixed to the lower mold 105 via the housing 106. The squeeze ring 202 includes a guide receiving portion 213, and the guide receiving portion 213 is accommodated in the guide 111 to guide the rotation of the squeeze ring 202 with respect to the lower mold 105. A gap may be provided between a lower surface 110 of the lower mold 105 and an upper surface 214 of the guide receiving portion 213 such that the lower mold 105 and the guide receiving portion 213 do not come into contact with each other. Moreover, a gap may be provided between an upper surface 112 of the upper outer ring portion 107 and a lower surface 215 of the guide receiving portion 213 such that the upper outer ring portion 107 and the guide receiving portion 213 do not come into contact with each other.

Moreover, in a state where a gap is generated between the guide 111 and the squeeze ring 202, that is, a gap is generated between the lower surface 110 of the lower mold 105 and the upper surface 214 of the guide receiving portion 213, and a gap is generated between the upper surface 112 of the upper outer ring portion 107 and the lower surface 215 of the guide receiving portion 213, it is desirable that the first thrust bearing and the second thrust bearing be in the preloaded state. If these gaps do not exist, that is, if the guide receiving portion 213 contacts the lower mold 105 and the upper outer ring portion 107, the squeeze ring 202 can be prevented from moving relatively upward and downward with respect to the lower mold 105, and the upper thrust bearing and the lower thrust bearing can be in the preloaded state, when the press apparats 101 is operating. However, it is not preferable since the guide receiving portion 213, the lower mold 105, and the upper outer ring portion 107 are worn.

The rolling elements 207 of the upper thrust bearing, the rolling elements 208 of the lower thrust bearing, and the rolling elements 209 of the radial bearing may be arranged radially inward with respect to the upper outer peripheral surface 211 of the squeeze ring 202 that lies along the inner peripheral surface 109 of the lower mold 105. When the press apparatus 101 is operating, the squeeze ring 202 moves relatively upward and downward with respect to the lower mold 105. However, when any portion of the rolling elements 207 to 209 is radially outward with respect to the upper outer peripheral surface 211, since the thrust load applied to the rolling elements 207 to 209 changes with the upper outer peripheral surface 211 as a boundary, the rolling elements 207 to 209 may be damaged, and raceways of the rolling elements 207 to 209 of the lower outer ring portion 108, the upper inner ring portion 204, and the lower inner ring portion 205 may be damaged. When the rolling elements 207 to 209 are arranged radially inward with respect to the upper outer peripheral surface 211, since the thrust loads applied to the rolling elements 207 to 209 are the same, it is possible to prevent the rolling elements 207 to 209 from being damaged and prevent the raceways of the rolling elements 207 to 209 from being damaged.

As shown in FIG. 3, the rotating-layering mold 201 may include a driven pulley 206 fixed to a lower outer peripheral surface 212 of the squeeze ring 202. Then, as shown in FIG. 1, the press apparatus 101 including the rotating-layering mold 201 may include the drive unit 301 including a motor 302 having an output shaft 304 to rotate which are fixed to a fixed surface 114 which is a side surface of the main body frame of the press apparatus 101, a drive pulley 303 fixed to the output shaft 304, and a transmission member 113 of transmitting the rotation of the drive pulley 303 based on the rotation of the output shaft 304 to the driven pulley 206 to rotate the squeeze ring 202 according to the predetermined angle. The output shaft 304 of the motor 302 of the drive unit 301 rotates according to a predetermined angle, and the rotation is transmitted to the squeeze ring 202 via the drive pulley 303, the transmission member 113, and the driven pulley 206 such that the squeeze ring 202 can be supported by the upper thrust bearing, the lower thrust bearing, and the radial bearing so as to rotate, according to the predetermined angle, with respect to the lower mold 105. In addition, the driven pulley 206 and the drive pulley 303 may be timing pulleys. Moreover, the transmission member 113 may be a timing belt as long as it can transmit the rotation.

Figure 2:
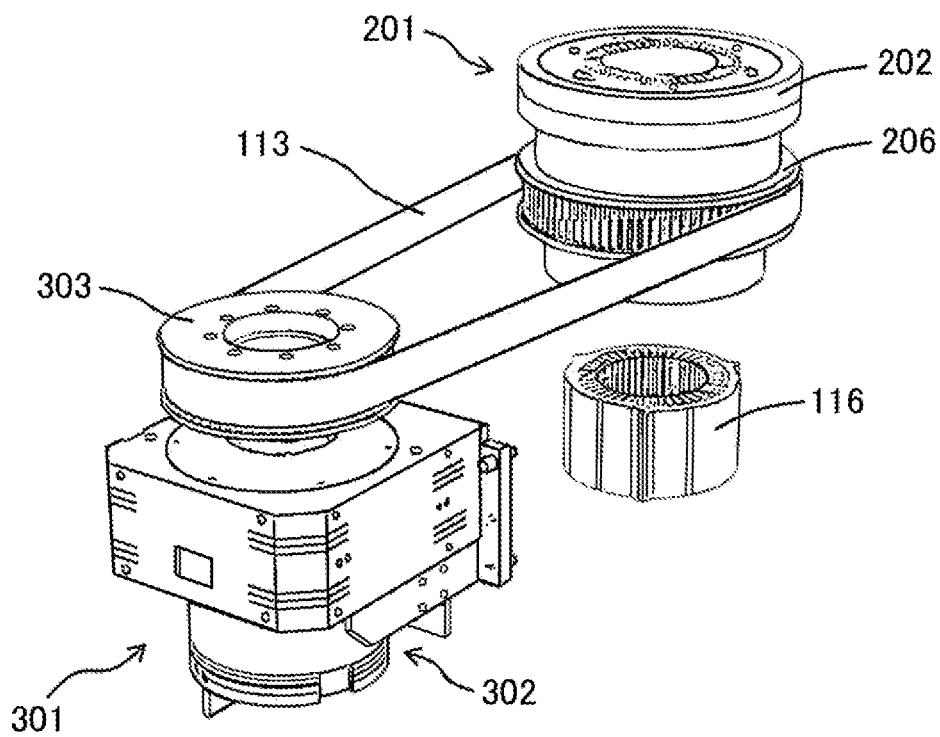
FIG. 2 is a perspective view showing the relation between the rotating-layering mold and the drive unit shown in FIG. 1 as seen from the upper.

As shown in FIG. 2, when the transmission member 113 is, for example, a timing belt, the radial load is generated in the horizontal direction by the tension of the timing belt of coupling the driven pulley 206 and the drive pulley 303, and in particular, when the squeeze ring 202 is rotated at high speed, the tension of the timing belt is increased such that more radial load is generated in the horizontal direction. As shown in FIG. 3, by configuring the radial bearing with the lower outer ring portion 108, the lower inner ring portion 205, and the rolling elements 209, since the squeeze ring 202 is not affected by the radial load due to the tension of the timing belt, and the posture of the squeeze ring 202 is not inclined in the direction of the tension, it is possible to improve the rotation accuracy of the squeeze ring 202 and improve the manufacturing accuracy for the motor cores. In addition, the radial bearing may be configured with the upper inner ring portion 204 instead of the lower inner ring portion 205, and the upper inner ring portion 204 or the lower inner ring portion 205 may be configured to be integrated with the squeeze ring 202.

Moreover, the drive unit 301 may include a rotation angle sensor clamped to the output shaft 304 such that a rotation angle of the output shaft 304 can be detected. Examples of the rotation angle sensor include, for example, a magnetic resolver and an optical encoder. The drive unit 301 may include a control apparatus that receives a signal regarding the rotation angle of the output shaft 304 detected by the rotation angle sensor. The control apparatus can determine whether or not the detected rotation angle of the output shaft 304 corresponds to a predetermined rotation angle to index with accuracy the rotation angle of the squeeze ring 202 that rotates via the transmission member 113.

It should be further understood by those skilled in the art that although the foregoing description has been made on embodiments of the present invention, the present invention is not limited thereto and various changes and modifications may be made without departing from the principle of the present invention and the scope of the appended claims.

The invention claimed is:

1. A rotating-layering mold of rotating, according to a predetermined angle, plate materials punched by a cooperation of an upper mold and a lower mold so as to laminate the plate materials, wherein the rotating-layering mold comprises a squeeze ring provided with a holding hole of holding the punched plate materials, wherein:

the squeeze ring is configured to rotate with respect to the lower mold such that an outer peripheral surface of the squeeze ring lies along an inner peripheral surface of the lower mold;

the rotating-layering mold further comprises a first thrust bearing, a second thrust bearing, and a radial bearing in order to support the rotation of the squeeze ring with respect to the lower mold;

the rotating-layering mold further comprises a first inner ring portion and a second inner ring portion, and the first thrust bearing, the second thrust bearing, and the radial bearing are arranged between the first inner ring portion and the second inner ring portion; and the first inner ring portion and the second inner ring portion are fastened such that the first thrust bearing and the second thrust bearing are in a preloaded state.

2. The rotating-layering mold according to claim 1, wherein the radial bearing is arranged between the first thrust bearing and the second thrust bearing.

3. The rotating-layering mold according to claim 1, wherein the rotation of the squeeze ring is guided by a guide configured with a second outer ring portion fixed to the lower mold and the lower mold.

4. The rotating-layering mold according to claim 3, wherein in a state where a gap is generated between the guide and the squeeze ring, the first thrust bearing and the second thrust bearing are in the preloaded state.

5. The rotating-layering mold according to claim 1, wherein the first thrust bearing is configured with a first outer ring portion fixed to the lower mold, the first inner ring portion, and rolling elements, the second thrust bearing is configured with the first outer ring portion, the second inner ring portion, and rolling elements, and the radial bearing is configured with the first outer ring portion, the first inner ring portion or the second inner ring portion, and rolling elements.

6. The rotating-layering mold according to claim 5, wherein the rolling elements of the first thrust bearing, the rolling elements of the second thrust bearing, and the rolling elements of the radial bearing are arranged radially inward with respect to the outer peripheral surface of the squeeze ring.

7. The rotating-layering mold according to claim 1, further comprising a driven pulley fixed to the squeeze ring.

8. A press apparatus comprising the rotating-layering mold according to claim 7, wherein the press apparatus comprises:

a drive unit comprising a motor having an output shaft to rotate;

a drive pulley fixed to the output shaft; and a transmission member of transmitting the rotation of the drive pulley based on the rotation of the output shaft to the driven pulley and rotating the squeeze ring according to the predetermined angle.

* * * * *